_United States Patent_ [19]

Ernst

[11] 4,170,828

[45] Oct. 16, 1979

[54] ERROR CORRECTION APPARATUS FOR LONGITUDINAL MEASURING INSTRUMENT

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 907,662

[22] Filed: May 19, 1978

[30] Foreign Application Priority Data

Jun. 2, 1977 [DE]  Fed. Rep. of Germany ....... 2724858

[51] Int. Cl.$^2$ ......................... G01B 5/04; G01B 11/04
[52] U.S. Cl. ............................. 33/125 R; 33/125 C; 356/373
[58] Field of Search ............. 33/125 R, 125 A, 125 C, 33/125 T; 356/169, 170, 172, 373, 374; 250/237 G

[56] References Cited

U.S. PATENT DOCUMENTS

| 226,162 | 4/1880 | Darling | 74/424.8 R |
|---|---|---|---|
| 2,336,550 | 12/1943 | Kruper | 33/177 |
| 2,995,826 | 8/1961 | Brault | 33/125 T |
| 3,039,032 | 6/1962 | Fowler | 318/632 |
| 3,182,375 | 5/1965 | Hoffrogge | 29/1 R |
| 3,816,003 | 6/1974 | Litke | 33/125 C |
| 4,047,586 | 9/1977 | Dlugos | 250/237 G |

FOREIGN PATENT DOCUMENTS

| 866402 | 2/1953 | Fed. Rep. of Germany . | |
|---|---|---|---|
| 1070522 | 12/1959 | Fed. Rep. of Germany . | |
| 1231595 | 12/1966 | Fed. Rep. of Germany . | |
| 1303080 | 5/1971 | Fed. Rep. of Germany . | |
| 2042505 | 3/1972 | Fed. Rep. of Germany . | |
| 47-45024 | 11/1972 | Japan | 356/169 |
| 266408 | 1/1950 | Switzerland . | |
| 455303 | 6/1965 | Switzerland | 33/125 R |

_Primary Examiner_—Richard E. Aegerter
_Assistant Examiner_—John W. Shepperd

_Attorney, Agent, or Firm_—Hume, Clement, Brinks, Willian & Olds, Ltd.

[57] ABSTRACT

An error correction apparatus adapted for use with a longitudinal measuring instrument is disclosed. In the preferred embodiment the correction apparatus is mounted on a measuring instrument having a longitudinal scale, a scanning unit movable along the scale, and a housing surrounding the scale and the scanning unit. In measuring the relative position of two objects, the first object is connected to the housing and the second object is connected to the scanning unit via the correction apparatus of this invention. The correction apparatus includes a segmented correction profile made up of a plurality of individual correction members joined end to end to form a track extending substantially in the direction of the scale. The correction members are pivotably interconnected by joints which permit a limited amount of longitudinal movement between adjacent correction members. In this preferred embodiment each correction member is mounted on a shaft which is in turn eccentrically mounted on a rotatable disc secured to the housing. The position of the correction profile transverse to the scale can be adjusted by rotating these discs and the transverse position of the correction profile at any point is adjusted to correspond in a predetermined manner to the desired correction to be made. Pivotably mounted on the scanning unit is a lever arm which includes a roller on one end and an eccentrically mounted disc on the other. The lever arm is so arranged that the roller moves along the correction profile as the scanning unit moves along the scale, and the eccentric disc is positioned to determine the spacing between the second object and the scanning unit. As the lever arm pivots to follow the correction profile, the eccentric disc is rotated, thereby altering the separation between the scanning unit and the second object and introducing the desired error correction.

11 Claims, 6 Drawing Figures

FIG. 1
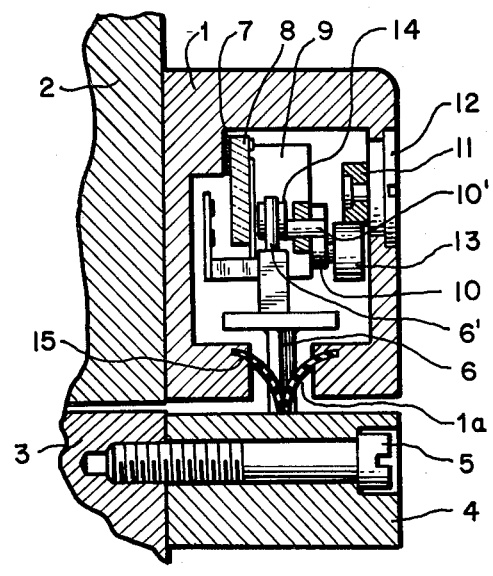
FIG. 2
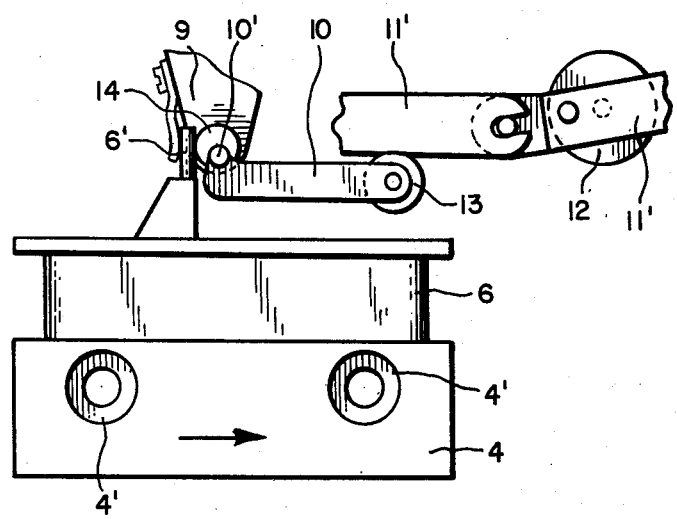
FIG. 3
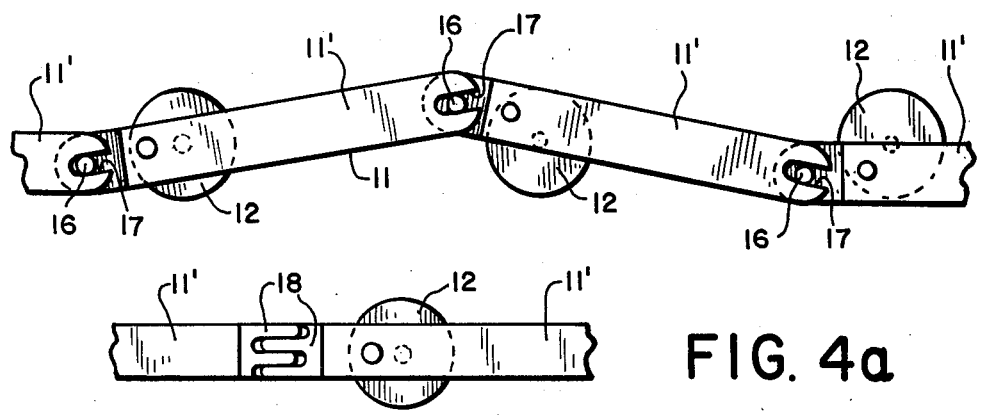
FIG. 4a
FIG. 4b
FIG. 5
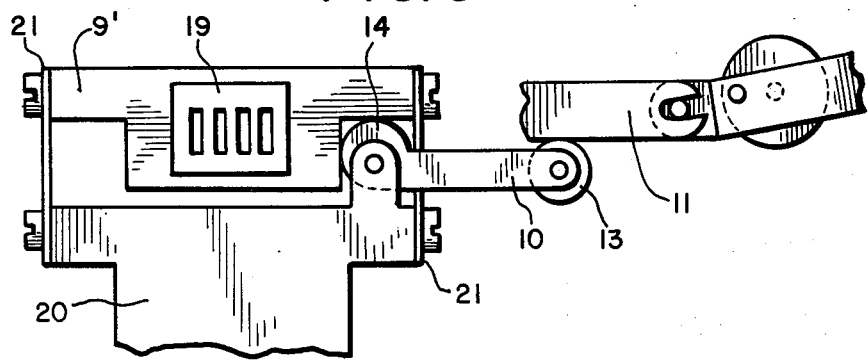

ERROR CORRECTION APPARATUS FOR LONGITUDINAL MEASURING INSTRUMENT

BACKGROUND OF THE INVENTION

The present invention relates to an error compensation apparatus for precision machines and measuring instruments, and more particularly to a correction apparatus for use with an encapsulated longitudinal measuring instrument adapted for measuring the relative position of two objects, such as the bed and the carriage of a precision machine tool.

Various types of correction systems for the compensation of measurement errors are known in the prior art. For example, German Patent DE-PS No. 866 402 describes a measuring system having a correction ruler whose cursor is mechanically adjusted by an amount corresponding to the prevailing error of the spindle with reference to the ruler. A position measuring system with a correction pattern is described in U.S. Pat. No. 3,039,032, which is scanned by a sensor which directly acts on the transmitter of the reading (rotary transmitter). German DT-AS No. 1 231 595 discloses an apparatus for the remote electrical indication of the movements of a mobile machine component where a system is used which has a deformable metal tape which is scanned by a transmitter for the compensation of errors. Another error correction system is described in German DT-OS No. 2 042 505 in which the numerical measuring system of a machine is provided with an additional movement commensurate with the prevailing value of the error of the machine spindle by a scanning means which reads a correction stencil.

In part, the afore-mentioned correction systems are relatively complex systems which require additional electrical adjustment apparatus or rotary transmitters or which are coupled directly to the machine. However, in all cases their construction is relatively expensive and the cost of such systems precludes their use in many applications.

SUMMARY OF THE INVENTION

The present invention is directed to an error correction apparatus for use with longitudinal measuring instruments which is of a relatively simple design and can be fabricated inexpensively. The apparatus of this invention can be mounted in a small space, has a large correction range, and allows nonlinear as well as linear correction. The apparatus exhibits inherent errors which are negligibly small in many applications and moreover, can be used on measuring instruments capable of measuring large distances.

The error correction apparatus of this invention includes a correction profile made up of a plurality of correction members extending substantially in the measurement direction. Individual correction members are adjustable transverse to the measuring direction, and the transverse position of the profile is correlated with the magnitude of the error correction. The apparatus further includes measuring means for gauging the transverse position of the profile, and positioning means responsive to the measuring means for adjusting the separation between one of the objects being measured and a part of the measuring instrument, thereby effecting the error compensation.

In the preferred embodiment of the invention the correction profile is arranged within a housing and the individual correction members are positioned by means of eccentrics mounted in the housing so as to be adjustable from the outside of the housing.

The invention, together with further objects and attendant advantages thereof, will be best understood by reference to the following description taken in connection with the accompanying drawings.

BRIEF DESCRIPTION OF THE DRAWINGS

FIG. 1 is a cross-sectional view taken through an encapsulated longitudinal measuring instrument which includes an embodiment of the error correction apparatus of this invention.

FIG. 2 depicts a longitudinal sectional view of a first portion of the instrument of FIG. 1.

FIG. 3 is a longitudinal sectional view of a second portion of the instrument of FIG. 1.

FIG. 4a is a longitudinal sectional view of a second embodiment of the apparatus of FIG. 3.

FIG. 4b is a plan view of the embodiment of FIG. 4a.

FIG. 5 is a longitudinal sectional view of a measuring instrument which includes a second embodiment of the invention.

DETAILED DESCRIPTION OF A PREFERRED EMBODIMENT

Referring now to the drawings, the simplified sectional representation in FIG. 1 shows an encapsulated longitudinal measuring apparatus with a housing 1 fixedly mounted at the bed 2 of a processing or measuring machine. A carriage 3 of the machine bears a mounting leg 4 which is secured for example by screws 5 to the carriage 3. The mounting leg 4 is equipped with a blade like member 6 which extends through a slot 1a into the interior of the housing 1. A scale 8 which incorporates the measuring standard is mounted on one inside surface of the housing 1 by way of an elastic adhesive layer. A scanning unit 9, incorporating any of several well-known means (not shown) for reading the scale 8, is positioned at the scale 8 and coupled to the mounting leg 4. In this embodiment, the relative movement of the machine carriage 3 is transmitted from the mounting leg 4 via coupling means such as the blade 6 to an angle lever 10, and from there to the scanning unit 9.

Without a correction system, any guiding errors of machine bed 2 and machine carriage 3 would be transmitted to the scanning unit and would introduce an error into the reading. The longitudinal measuring instrument, therefore, is provided with a correction system which is located in the interior of the housing 1. Individual correction members 11', which are inherently stiff, are linked to form a correction profile 11. These correction members 11' can be adjusted transversely to the measuring direction by rotating the eccentrics 12 from the exterior of the housing. The angle lever 10 is connected to the scanning unit 9 pivotably about an axis 10'. One free end of the angle lever bears a roller 13 which is adapted to measure the transverse position of the correction profile 11 by tracking the profile and pivoting the angle lever 10 about the axis 10'. The pivotal movement of the angle lever 10 corresponds with the magnitude of the error to be corrected. The correction is accomplished by a positioning means which includes a contact surface provided on the second arm of the angle lever. In this embodiment the contact surface includes an eccentric 14 which acts to convert the pivotal movement of the angle lever into a relative movement between the scanning unit 9 and the blade 6. The blade 6 protrudes through the slot 1a of the housing and is tightly embraced by sealing lips 15 arranged roof-like to insure the complete encapsulation of the measuring instrument.

FIG. 2 shows a portion of the instrument shown in FIG. 1 in a lateral view. The mounting leg 4 defines perforations 4' for the fastening screws 4 and carries the blade 6 whose upper portion is provided with a cylindrical entrainment pin 6' which contacts the eccentric 14 of the angle lever 10. The scanning unit 9 is only shown fragmentarily to the extent where the fastening of the angle lever 10 by means of the shaft 10' can be seen in it. If the mounting leg 4 is shifted in the direction of the arrow, the scanning unit 9 follows this longitudinal movement and the angle lever 10 along with the roll 13 scans the correction profile 11 whose members 11' are deflected via eccentrics 12 commensurate with the magnitude of the desired correction. Thereby the angle lever 10 is pivoted about its axis 10' and the eccentric 14 rotates to alter the separation between the scanning unit 9 and the cylindrical entrainment pin 6'. Thus, the guiding error characteristic of the mounting leg 4 and the machine carriage 3 can be compensated by a relative movement between scanning unit 9 and mounting leg 4 caused by the correction profile 11.

FIG. 3 shows a correction profile 11 where the individual correction members 11' are positioned by a plurality of discs 12, each of which includes an eccentrically mounted pin. Since the deflection produces changes in length, the individual members are provided with pins 16 and cutouts 17 which form joints where longitudinal displacement is possible.

FIGS. 4a and 4b represent a variant of the joints which allows for longitudinal mobility. The ends of the links 11' are equipped with resilient members 18 which interlock comb-like.

FIG. 5 shows a portion of a second instrument embodying the invention which includes a scanning plate 9' provided with a graduation 19. As in FIG. 1, this embodiment is a photoelectric digital longitudinal measuring instrument. In a simple design the scanning unit 9 is not guided at the scale 8, but instead is connected directly via coupling means 20 to one of the above mentioned objects 3. The scanning plate 9' is so connected via leaf springs 21 to the coupling means 20 as to be movable in the measuring direction with respect to the coupling means 20 by the angle lever 10, roller 13, and eccentric 14.

Of course, it should be understood that various changes and modifications to the preferred embodiments described herein will be apparent to those skilled in the art. For example, the invention is not limited to digital photoelectric measuring instruments, but instead is applicable to optical, inductive, capacitive, or magnetic measuring instruments. Naturally, the invention is not limited to the correction of guiding errors, but may also be used for the correction of internal graduation errors. Such changes and modifications can be made without departing from the scope of the present invention and without diminishing its attendant advantages. It is, therefore, intended that such changes and modifications be covered by the following claims.

I claim:

1. In a measuring instrument including a measuring scale, a scanning unit adapted to move along the scale, and means for coupling the scanning unit to an object whose position is to be measured, wherein said coupling means is operative to permit relative movement between the scanning unit and the object in the direction of the scale, an error compensation apparatus comprising:
    a plurality of correction members linked to form a correction profile extending substantially in the direction of the scale;
    adjustment means for adjusting the position of at least a portion of the correction members transverse to the direction of the scale;
    measuring means for sensing the position of the correction profile transverse to the direction of the scale; and
    positioning means responsive to the measuring means for positioning the scanning unit with respect to the object in the direction of the scale such that the separation therebetween in the direction of the scale corresponds in a predetermined manner with the measured position of the correction profile.

2. The apparatus of claim 1 wherein the measuring instrument includes a housing surrounding the scale and the adjustment means includes means for mounting individual correction members at the interior of the housing and means extending to the exterior of the housing for adjusting the transverse position of individual correction members.

3. The apparatus of claim 2 wherein the correction members are linked by joints which permit longitudinal displacement between adjacent members.

4. The apparatus of claim 3 wherein each of the joints includes a plurality of interlocking flexible fingers.

5. The apparatus of claim 1 wherein the measuring means includes a lever arm pivotably mounted on the scanning unit and a roller mounted on the lever arm and adapted to track the correction profile as the scanning unit moves along the scale, and further, wherein the positioning means includes a contact surface mounted on the lever arm so as to contact the coupling means and to determine the separation between the coupling means and the scanning unit, such that the pivoting motion of the lever arm alters the orientation of the contact surface and thereby the separation between the coupling means and the scanning unit.

6. The apparatus of claim 5, wherein the contact surface is formed by an eccentric.

7. The apparatus of claim 1, wherein the scanning unit includes a scanning plate, and the positioning means positions the plate with respect to the coupling means.

8. The apparatus of claim 1 or 2 wherein the coupling means includes means for mounting the scanning unit to the coupling means.

9. In a measuring instrument including a slotted housing, a measuring scale within the housing, a scanning unit movable along the scale within the housing, a blade extending through the slot defined by the housing, and means for coupling the scanning unit to the blade such that the scanning unit is movable with respect to the blade in the direction of the scale, wherein the housing is secured to a first object, the blade is secured to a second object, and the instrument is adapted to measure the relative positions of the first and second objects along the direction of the scale, an error correction apparatus comprising:
    a plurality of rotatable discs mounted in the housing along a line extending substantially parallel to the scale, each of said discs including an eccentrically mounted pin extending into the interior of the housing;

a plurality of correction members linked to form a correction profile extending substantially in the direction of the scale, each of said correction members mounted on one of said pins wherein the position of the correction members transverse to the scale can be adjusted by rotation of the discs;

a lever arm pivotably mounted on the scanning carriage and having first and second end sections;

a roller mounted on the first end section of the lever arm, positioned to track the profile as the scanning unit moves along the scale and to pivot the lever arm into an angular position corresponding to the transverse position of the profile;

a contacting surface mounted on the second end section of the lever arm adapted to contact a portion of the blade and to determine the separation between the blade and the scanning unit, such that the separation is made variable as a function of the angular position of the lever arm.

10. The apparatus of claim 9 wherein the coupling means includes means for mounting the scanning unit to the blade.

11. In a measuring instrument including a housing, a measuring scale within the housing, a scanning unit adapted to move along the scale, and means for coupling the scanning unit to an object whose position is to be measured wherein said coupling means is operative to permit relative movement between the scanning unit and the object in the direction of the scale, an error correction apparatus comprising:

a plurality of correction members linked to form a correction profile extending within the housing substantially in the direction of the scale;

measuring means for sensing the position of the correction profile transverse to the direction of the scale;

positioning means responsive to the measuring means for positioning the scanning unit with respect to the object in the direction of the scale such that the separation therebetween in the direction of the scale corresponds in a predetermined manner with the measured position of the correction profile; and means extending to and manipulatable from the outside of the housing for selectively adjusting the transverse position of individual correction members.

* * * * *